United States Patent [19]
Horiki et al.

[11] Patent Number: 5,206,069
[45] Date of Patent: Apr. 27, 1993

[54] PANEL TYPE MASKING MEMBER

[75] Inventors: Seinosuke Horiki; Reiji Makino, both of Tokai, Japan

[73] Assignee: Nagoya Oilchemical Co., Ltd., Nagoya, Japan

[21] Appl. No.: 893,599

[22] Filed: Jun. 2, 1992

Related U.S. Application Data

[63] Continuation of Ser. No. 785,916, Nov. 4, 1991, abandoned, which is a continuation of Ser. No. 231,523, Aug. 11, 1988, abandoned.

Foreign Application Priority Data

Aug. 12, 1987 [JP] Japan .................. 62-201310

[51] Int. Cl.⁵ .................. B32B 3/26; B32B 3/30; B32B 7/12
[52] U.S. Cl. .................. 428/43; 428/40; 428/159; 428/167; 428/172; 428/178; 428/198; 428/314.4; 428/317.3; 428/317.7; 428/318.8; 428/352
[58] Field of Search .................. 428/40, 43, 159, 167, 428/172, 178, 198, 314.4, 317.3, 317.7, 318.8, 352

[56] References Cited

U.S. PATENT DOCUMENTS

| | | | |
|---|---|---|---|
| 4,528,221 | 7/1985 | Komatsuzaki et al. | 428/319.9 |
| 4,714,633 | 12/1987 | Horiki et al. | 428/40 |
| 4,759,959 | 7/1988 | Guy | 427/282 |
| 4,835,026 | 5/1989 | Horiki et al. | 428/317.3 |

Primary Examiner—William J. Van Balen
Attorney, Agent, or Firm—Cooper & Dunham

[57] ABSTRACT

A panel type masking member comprising a foamed polystyrene panel made by expandable bead molding wherein said foamed polystyrene panel has traces of opening parts of breathing paths on both sides thereof wherein said trace(s) on at least one side is(are) dent(s), and a mold used for molding of said panel type masking member comprising a fixed molding part and a movable molding part wherein said movable molding part and said fixed molding part have opening parts of breathing paths on their surface(s) thereof and said opening part(s) of breathing path(s) of said movable molding part and/or said fixed molding part rise(s) from said surfaces thereof; are provided in the instant invention.

1 Claim, 4 Drawing Sheets

PANEL TYPE MASKING MEMBER

This is a continuation of application Ser. No. 07/785,916, filed Nov. 4, 1991, which was a continuation of U.S. patent application Ser. No. 07/231,523 filed Aug. 11, 1988, all now abandoned.

FIELD OF THE INVENTION

The instant invention relates to a panel type masking member used to protect a part of an article such as the underside of the floor of the cars, and the like from a surface treatment such as coating, plating, phosphatizing and the like, and a mold used for molding of said panel type masking member.

More particularly, the instant invention relates to a panel type masking member comprising a foamed polystyrene panel made by expandable bead molding wherein said foamed polystyrene panel has trace(s) of the opening parts of breathing paths on both sides thereof wherein said trace(s) on at least one side is(are) dent(s), and a mold used for molding of said panel type masking member comprising a fixed molding part and a movable molding part wherein said fixed molding part and said movable molding part have opening parts of breathing paths on their surface(s) thereof and said opening part(s) of said breathing path(s) of said movable molding part and/or said fixed molding part rise(s) from said surface(s) thereof; are provided in the instant invention.

DESCRIPTION OF THE PRIOR ART

Hitherto, adhesive tapes have been used as a masking member to protect a part of an article such as the underside of the floor of the cars and the like from a surface treatment, such as coating, plating, phosphatizing and the like. Namely, the adhesive tapes are attached to a part of an article to protect it from a surface treatment and after the surface treatment, said adhesive tapes are removed from the part of the article. Said part is not affected by said surface treatment since said part was covered with the adhesive tapes during the surface treatment.

Nevertheless, said adhesive tapes as the masking member has faults that in case that the part to be protected from the surface treatment is wide, it is troublesome to attach the adhesive tapes to the part to be protected and remove said adhesive tapes from said part since a number of strips of adhesive tapes must be attached to said part to cover the whole part, and further, in the case that adhesive tapes are subjected to heat, said adhesive tapes stick to the part due to heating and the stripping of said adhesive tapes becomes very difficult.

To improve said adhesive tapes as a masking member, a panel type masking member comprising of foamed polystyrene has been provided (U.S. patent application Serial No. This is a continuation of U.S. patent application Ser. No. 07/785,916, filed Nov. 4, 1991, which was a continuation of U.S. patent application Ser. No. 07/231,523 filed Aug. 11, 1988, all now abandoned. Said panel type masking member is attached to a part of an article to be protected by an adhesive coating layer formed on a side of said panel. Said foamed polystyrene panel of said masking member has been made by expandable bead molding using a mold comprising a fixed molding part and a movable molding part wherein said fixed molding part and said movable molding part have opening parts of breathing paths on their surfaces thereof. Since said opening parts of breathing said paths are dented from said surfaces of said fixed molding part and said movable molding part, said foamed polystyrene panel has rising parts which are traces of said opening parts of breathing paths, and said rising parts of said foamed polystyrene panel obstruct the smooth coating of the adhesive on the surface of said foamed polystyrene, and further an opening is foamed between the circumference of said rising parts of said foamed polystyrene panel of the masking member and a part of an article to which said masking member is attached, and as the result, said masking member is apt to slip on said part of said article or is apt to slip out from said part of said article, and still further, since the surface-treating agent enters into said opening between said circumference of said rising part of said foamed polystyrene panel and said part of said article, the complete protection of the masking member cannot be expected.

SUMMARY OF THE INVENTION

Accordingly, an object of the instant invention is to save trouble when the adhesive is coated on the surface of said foamed polystyrene panel of the masking member.

A further object of the instant invention is to prevent slipping of the masking member on a part of an article to which the masking member is attached or prevent the masking member slipping out from said part of said article.

Still a further object of the instant invention is to prevent the surface-treating agent going into the opening between the masking member and said part of said article and to attain the complete protection of the masking member for said part of said article.

Briefly, these objects of the instant invention can be attained by a panel type masking member comprising a foamed polystyrene panel made by expandable bead molding wherein said foamed polystyrene panel has traces of the opening parts of breathing paths on both sides thereof. Said panel type masking member may be molded by a mold comprising a fixed molding part and a movable molding part wherein said movable molding part and said fixed molding part have opening parts of breathing paths on their surface(s) thereof and said opening part(s) of said breathing path(s) rise(s) from said surface(s) thereof.

BRIEF DESCRIPTION OF THE DRAWINGS

FIG. 1 is a side sectional view of a mold, FIG. 2 is a partial perspective view of said mold, FIG. 3 is a side sectional view of said mold into which polystyrene expandable beads are charged, FIG. 4 is a perspective view of a masking member made by using said mold, FIG. 5 is a side view of said masking member on whose surface an adhesive coating layer is foamed and said adhesive coating layer is covered with a release sheet, FIG. 6 is a partial perspective view of an article, to whose part said masking member is attached and a surface treatment is carried out on said part of said article, and FIG. 7 is a partial perspective view of said article from whose part, said masking member has been removed after said surface treatment.

DETAILED DESCRIPTION

Figure 1:
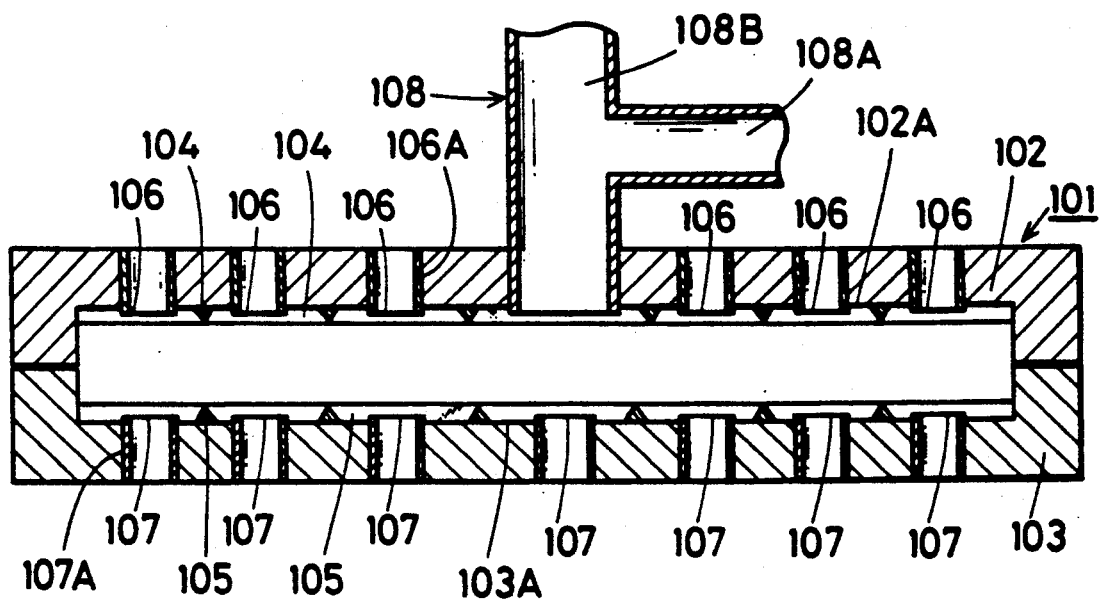
FIG. 1 to FIG. 7 relate to an embodiment of the instant invention.
Figure 2:
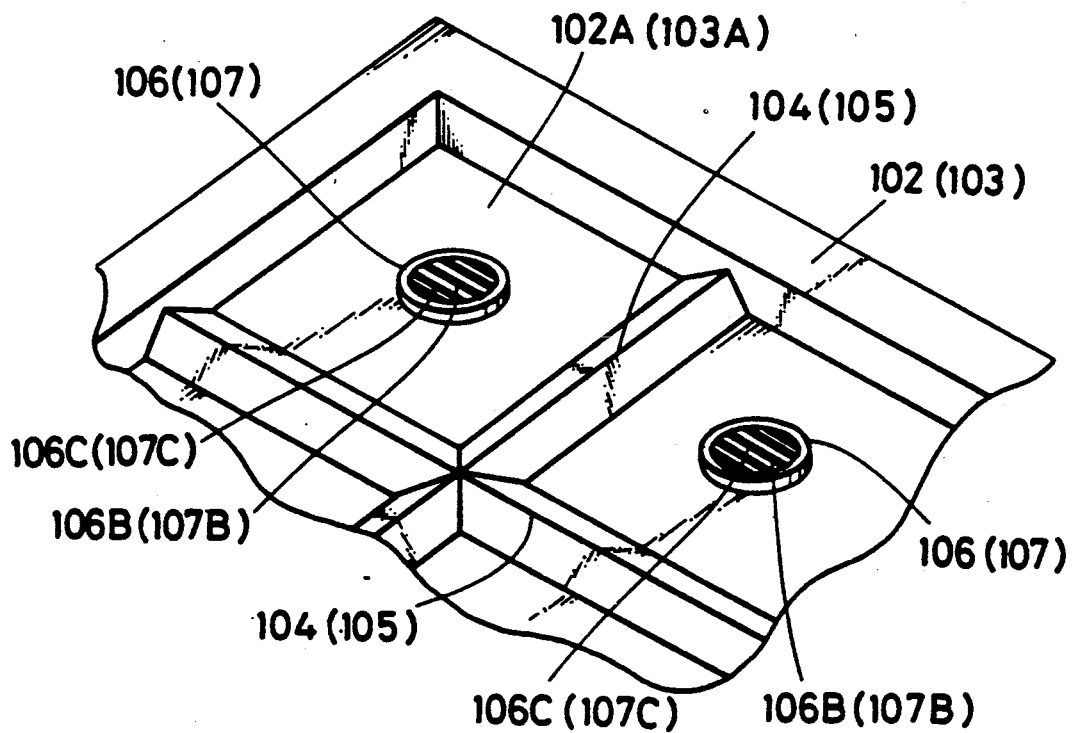
Figure 3:
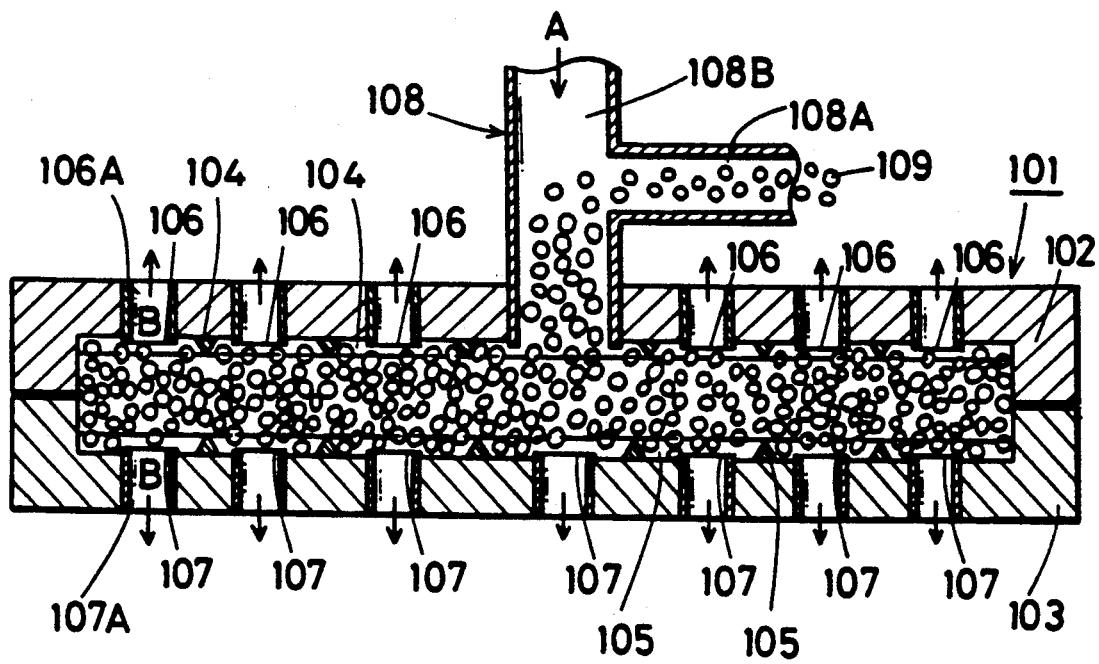
Figure 4:
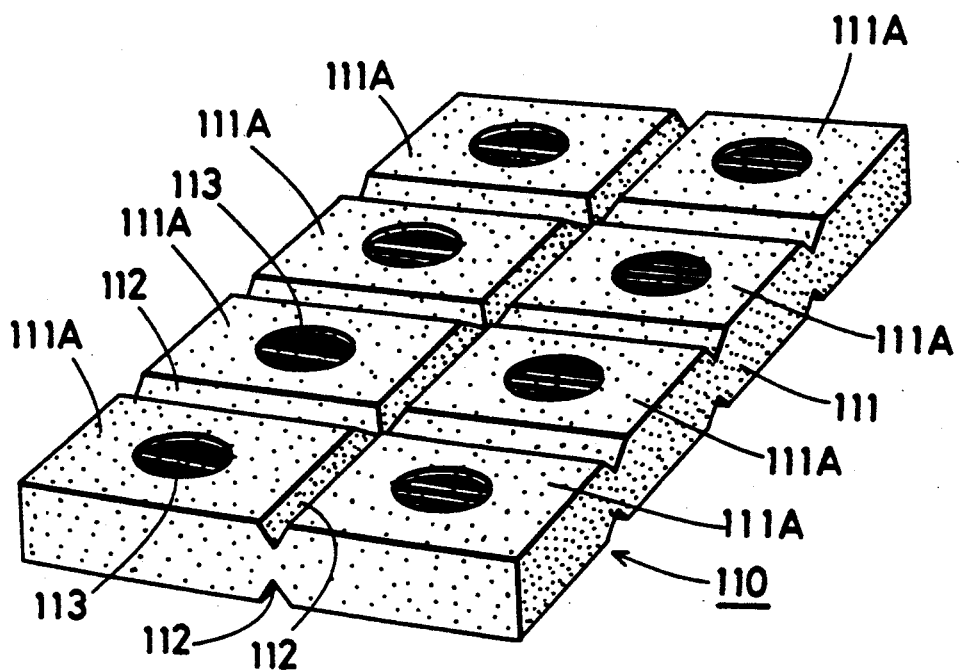

FIG. 1 to FIG. 7 relate to an embodiment of the instant invention. Referring now to FIG. 1 and FIG. 2, a mold (101) is used for the molding of a masking member and comprises a fixed molding part(102) and a movable molding part(103). The surfaces(102A) and (103A) of said fixed molding part(102) and said movable molding part(103) are checkered by ridges(104) and (105) and opening parts(106) and (107) of breathing paths(106A) and (107A) are arranged on the surfaces of each block(102A) and (103A) enclosed by said ridges(104) and (105). Said opening parts(106) and (107) rise from said surfaces of said blocks(102A) and (103A) and a plural number of partitions(106B) and (107B) are arranged in each of said breathing paths(106A) and (107A) to form slits(106C) and (107C). Heights of said rising opening parts(106) and (107) are commonly from about 0.2 to about 0.5 mm. A charging means(108) for expandable polystyrene beads connects to said fixed molding part(102) of said mold(101) and said charging means(108) consists of a path(108A) to charge said expandable polystyrene beads into said mold(101) and a path(108B) to supply steam into said mold(101). To mold a masking member comprising a foamed polystyrene panel, said fixed molding part(102) and said movable molding part(103) are combined together to set up said mold(101) and steam is supplied into said mold (101) through said path(108B) of said charging means(108) as shown in FIG. 3,Arrow A, then expandable polystyrene beads(109) are sucked into said mold(101) through said path (108A) by the stream of said steam as shown in FIG. 3, Arrow B. Air in said mold(101) and said steam supplied into said mold(101) are exhausted from said breathing paths (106A) and (107A) of said fixed molding part(102) and said movable molding part(103) so that said expandable polystyrene beads(109) are uniformly charged into said mold(101). Further, width of said slits(106C) and (107C) of said breathing paths(106A) and (107A) are established to be smaller than the diameter of said expandable polystyrene beads(109) to prevent leakage of said expandable polystyrene beads(109) from said breathing paths(106A) and (107A). Said expandable polystyrene beads(109) charged into said mold(101) are heated by said steam to expand and a masking member(110) comprising a foamed polystyrene panel shown in FIG. 4 is molded. During said molding, the gas of a blowing agent is also exhausted from said breathing paths (106A) and (107A) of said fixed molding part(102) and said movable molding part(103) so that said expandable polystyrene beads(109) uniformly expand in said mold(101) to form said foamed polystyrene panel having a uniform cellular structure.

As shown in FIG. 4, the resulting masking member(110) comprises a foamed polystyrene panel(111) and checker grooves(112) are formed at regular intervals on both sides of said panel(111) wherein said grooves(112) are formed directly opposite each other. Said grooves(112) are formed by said ridges(104) and (105) on said surfaces(102A) and (103A) of said fixed molding part(102) and said movable molding part(103) of FIG. 3. Further, dents(113) which are traces of the opening parts(106) and (107) of breathing paths(106A) and (107A), are formed on both sides of each blocks(111A) enclosed by said grooves(112).

Figure 5:
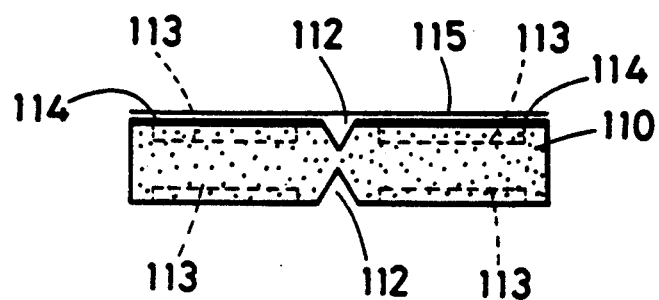

As shown in FIG. 5, an adhesive is coated on one side of said panel(111) to form an adhesive coating layer(114) and said adhesive can be smoothly and uniformly coated on one side of said panel(111) by a coating machine such as a roll coater, knife coater, and the like since said panel (111) has no rising part on its surface. Further, said adhesive coating layer(114) is not formed on said dents (113) of each block(111A) and is covered with a release sheet(115) such as polyethylene film, a polypropylene film, a release paper, and the like to prevent sticking to another article, hands of workers, and the like when said masking member(110) is handled: one placed upon another, transported, and the like.

Figure 6:
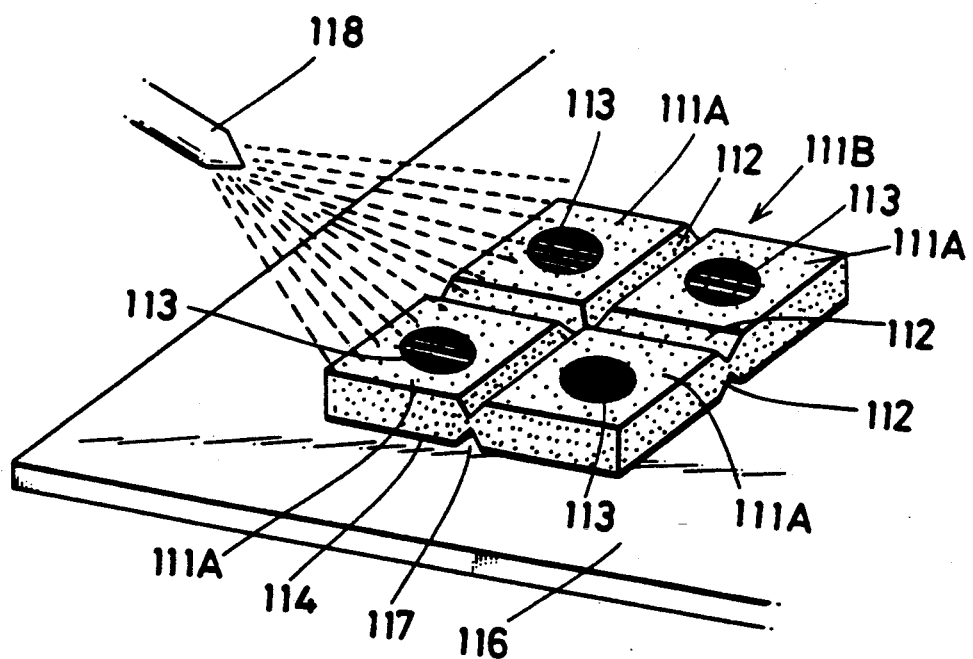

When the masking member(110) is used as shown in FIG. 6, said release sheet(115) is removed from said adhesive coating layer(114) and said panel(111) is snapped along said grooves(112) by hand to a piece(111B) having the proper size corresponding with a part(117) of an article(116) which is necessary to be protected from a surface treatment such as coating, plating, phosphatizing and the like. The resulting piece(111A) is then attached to a part(117) of said on article(116) by said adhesive coating layer(114) thereof.

Figure 7:
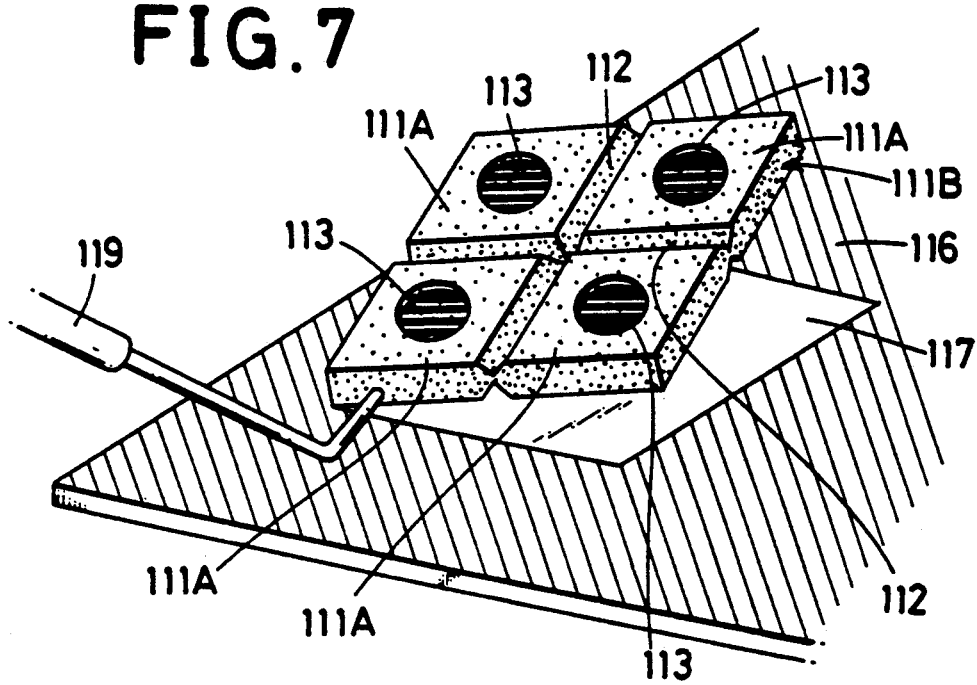

In the case of said coating, a coating material, such as a paint, a polyvinylchloride, plastisol, and the like is sprayed from a spray gun(118) on the surface of said article(116). Said part(117) of aid article(116) is not subjected to said coating since said part(117) is covered with said piece(111A) of the masking member(110). After coating, said coated article(116) is heated to dry and/or cure if desired. After or before said heating, said piece (111A) of said masking member(110) is stripped by a hook (119) as shown in FIG. 7 or by hand or in a case where the heating temperature is higher enough than the softening point of foamed polystyrene, as the material of said panel (111) of said masking member(111), said piece(111A) will shrink itself by said heating and come off by itself from said part(117) of said article(116).

As before described, since said piece(111A) of said masking member(110) has dents(113) on its surface, said piece(111A) partially attached to said part(117) of said article(116) by said adhesive coating layer(113) which is not formed on said dents(113) of each block(111A) so that said piece(111A) of said masking member(110) is very easily removed from said part(117) of said article(116). This property of said masking member(110) is very significant for a continuous process such as the process of anti-corrosion, and sound and vibration-proof treatment for the underside of cars.

Figure 8:
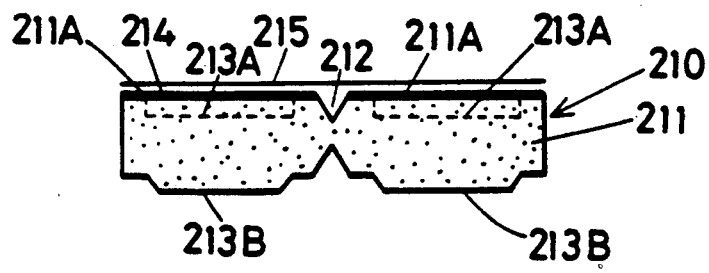
FIG. 8 is a side view of a masking member relating to another embodiment of the instant invention.

FIG. 8 relates to another embodiment of the instant invention. In this embodiment, a masking member(210) comprises a foamed polystyrene panel(211) and checker grooves(212) are formed at regular intervals on one side of said panel(211). Traces(213A) and (213B) of opening parts of breathing paths are formed on both sides of each blocks (211A) and said traces(213A) are dents on one side of said panel(211) while said traces(213B) are rising parts on the other side of said panel(211). Further an adhesive coating layer(214) covered with a release sheet(215) is formed on said one side of said panel(211).

Figure 9:
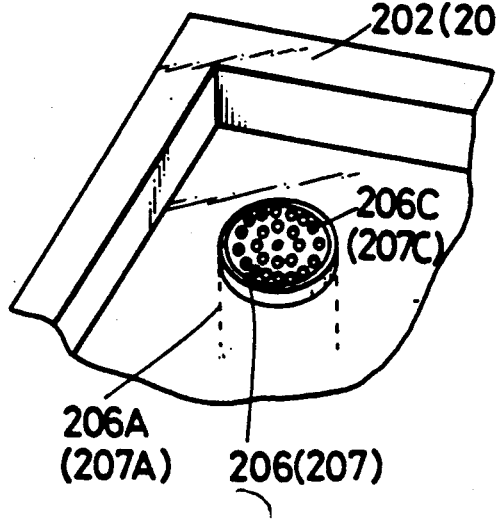
FIG. 9 is a partial perspective view of a mold of another embodiment.

FIG. 9 relates to still another embodiment of the instant invention. In this embodiment, the opening parts(206) and (207) of the breathing paths(206A) and (207A) of the fixed molding part(202) and said movable molding part(203) have small round holes(206C) and (207C) instead of slits(106C) and 107C) of the foregoing embodiment.

Figure 10:
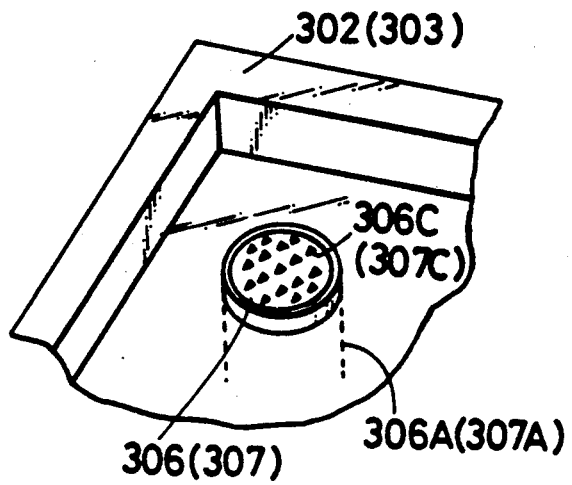
FIG. 10 is a partial perspective view of a mold of still another embodiment.

FIG. 10 relates to still another embodiment of the instant invention. In this embodiment, the opening parts(306) and (307) of the breathing paths(306A) and (307A) of the fixed molding part(302) and the movable molding part(303) have small triangular holes(306C) and (307C) instead of slits(106C) and (107C), and small round holes(206C) and (207C) of the foregoing embodiments.

Further, said ridges(104) and (105) of said mold(101) are not always necessary. In a case where said mold(101) has no ridge(s), said grooves(112) of said masking member(110) may be formed by such as cutting after said masking member (110) is molded. Nevertheless, said grooves(112) of said masking member(110) are not always necessary for the instant invention.

We claim:

1. A panel type masking member comprising a molded foamed polystyrene panel made by expandable polystyrene bead molding using a mold comprising a movable mold part and a fixed mold part wherein said movable mold part and said fixed mold part have an opening part of the breathing path on the surfaces thereof and said opening part of said breathing path of said movable mold part and/or said fixed mold part rises from said surface thereof and an adhesive coating layer is provided on one side of said molded foamed polystyrene panel, said foamed polystyrene panel having a plurality of grooves defining a checkerboard structure and further having at least one dent on at least one side on which said adhesive coating layer is formed, said dent being a trace of the opening part of the breathing path of said mold raising the surface of said mold and lying within a square of said checkerboard structure.

* * * * *